United States Patent [19]
Hake

[11] 3,838,964
[45] Oct. 1, 1974

[54] APPARATUS FOR PRODUCING A COMPOUND MOTION

[76] Inventor: George H. Hake, 11154 Broadway, Alden, N.Y. 14004

[22] Filed: May 18, 1973

[21] Appl. No.: 361,578

[52] U.S. Cl................... 425/429, 74/798, 259/57, 425/DIG. 33, 425/430
[51] Int. Cl........................... A23g 1/26, B29c 5/04
[58] Field of Search .... 425/429, 430, 434, DIG. 33; 259/57; 74/798; 264/310, 311

[56] References Cited
UNITED STATES PATENTS

| | | | |
|---|---|---|---|
| 3,016,573 | 1/1962 | Blue | 425/73 X |
| 3,095,260 | 6/1963 | Ferriot | 264/311 |
| 3,117,346 | 1/1964 | Bertin et al. | 425/430 |
| 3,128,501 | 4/1964 | Borah | 425/DIG. 33 |

Primary Examiner—J. Spencer Overholser
Assistant Examiner—David S. Safran
Attorney, Agent, or Firm—Ashlan F. Harlan, Jr.

[57] ABSTRACT

Apparatus for imparting to one or more workpieces a compound rotary motion about two intersecting axes simultaneously which comprises a stationary disc, an opposed rotatable disc, work-holding assemblies between said discs, each work-holding assembly comprising a wheel rotatable by said rotatable disc about an axis intersecting the axis of rotation of said rotatable disc and means for holding a workpiece including a permanent magnet; and means for causing rotation of said wheels and workpieces by rotating said rotatable disc in contact with said wheels while said wheels are in contact with said stationary disc.

10 Claims, 3 Drawing Figures

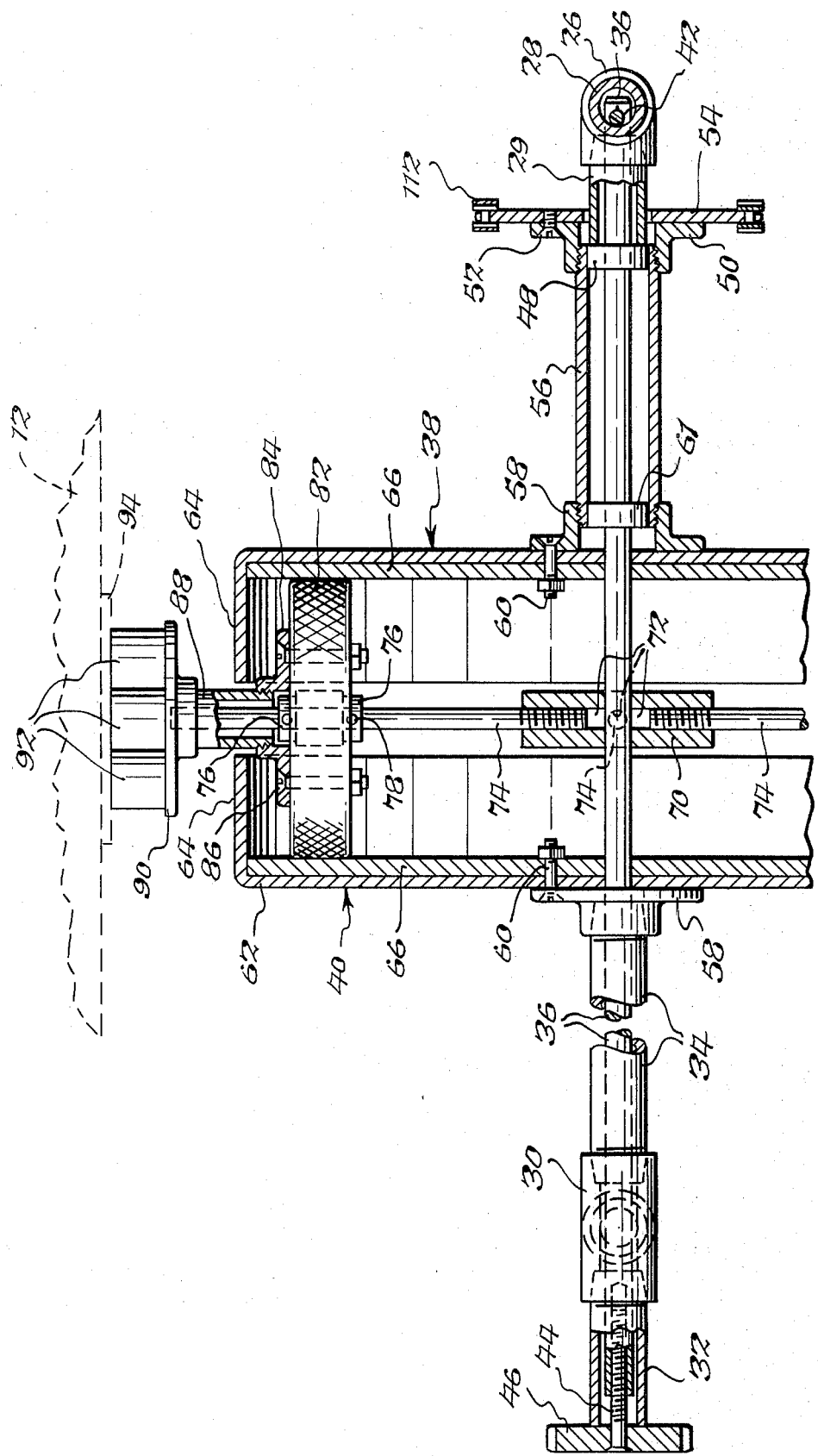

ptions and vo- 3,838,964

APPARATUS FOR PRODUCING A COMPOUND MOTION

BACKGROUND OF THE INVENTION

The present invention relates to an apparatus for imparting to one or more work-pieces a compound rotary motion about two axes simultaneously.

In one process for the production of edible, hollow chocolate products, liquid chocolate at a controlled temperature is poured into the cavity of a book-type mold through an opening. The mold cavity is partially filled with a pre-determined amount of chocolate, after which the mold is vibrated and/or turned to a variety of positions to cause the liquid chocolate to flow over the wall surfaces of the mold cavity and build up, as it cools, a hollow chocolate product having the shape of such surfaces. In many cases a preformed base of chocolate must be added to the chocolate article after molding. It is readily apparent that these operations, usually performed by hand, are arduous, inefficient, costly, and severely limit production. Also, the erratic or nonuniform movement of the mold during a hand turning operation tends to produce nonuniform wall thicknesses in the finished products.

SUMMARY OF THE INVENTION

The present invention, as hereinafter described, provides apparatus adapted to hold and rotate a workpiece, for example a rack carrying a plurality of molds of the general type described above, simultaneously about two intersecting axes at predetermined rates of speed, this gyration materially increasing the rate of production of the molded articles and producing more uniform products.

Generally speaking, the apparatus of this invention comprises a plurality of work-holding assemblies which are caused to revolve around one axis while simultaneously being rotated about other axes, respectively, that extend radially from said first axis. The means for accomplishing this is a differential drive mechanism which includes a stationary annular member and an opposing, spaced, coaxial, annular member having interposed therebetween freely rolling wheels constituting portions of said work-holding assemblies. Said wheels, by engagement with said annular members are caused to rotate about their own axes as they revolve around the axis of said annular members. Each of the work-holding assemblies also preferably includes one or more permanent magnets for attaching workpieces thereto.

BRIEF DESCRIPTION OF THE DRAWINGS

FIG. 3 is a partial horizontal sectional view, on an enlarged scale, taken on the plane of line 3—3 of FIG. 1.

DETAILED DESCRIPTION OF THE INVENTION

Figure 1:
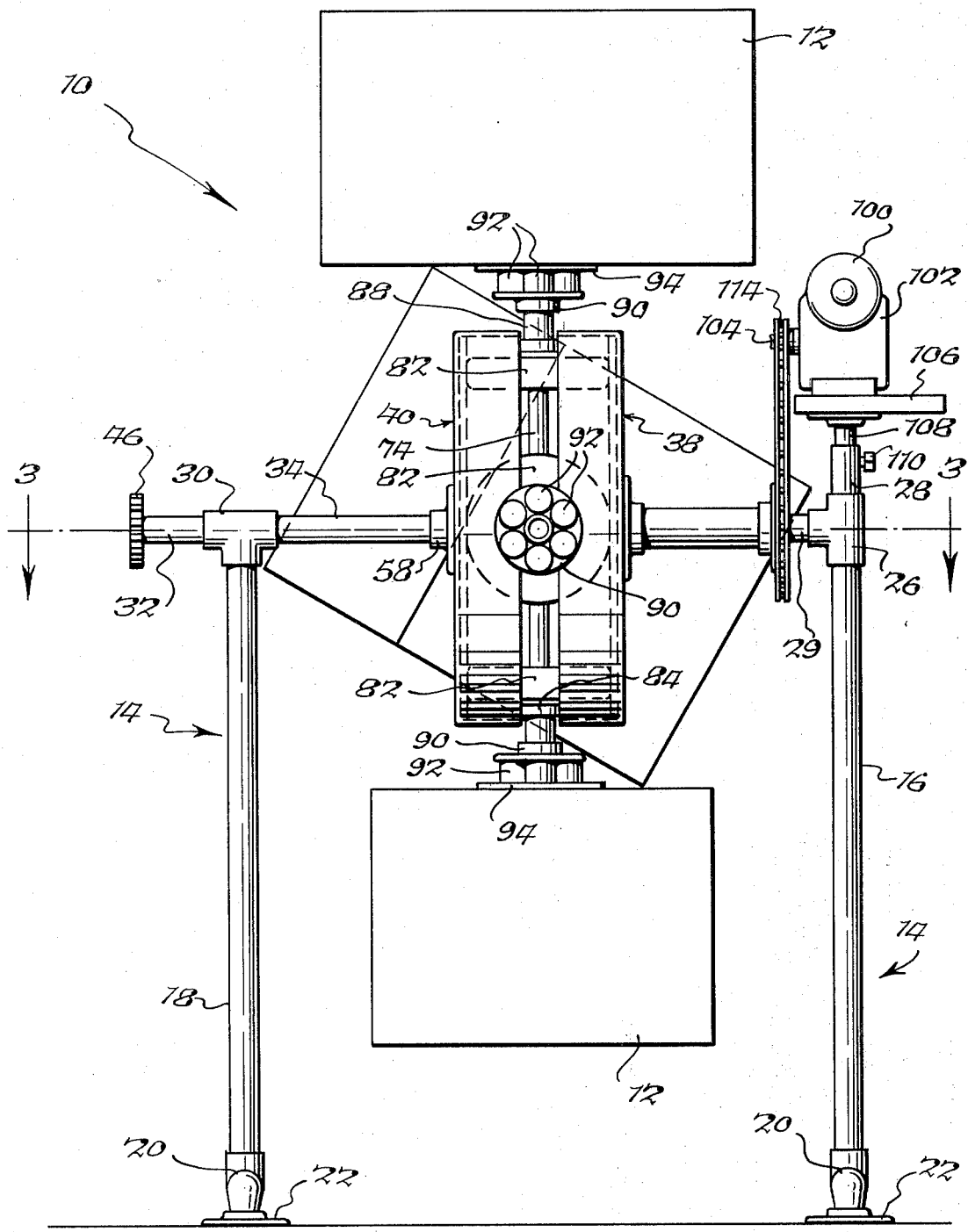
FIG. 1 is a front elevational view of apparatus constructed in accordance with the principles of this invention, showing a plurality of workpieces carried thereby.
Figure 2:
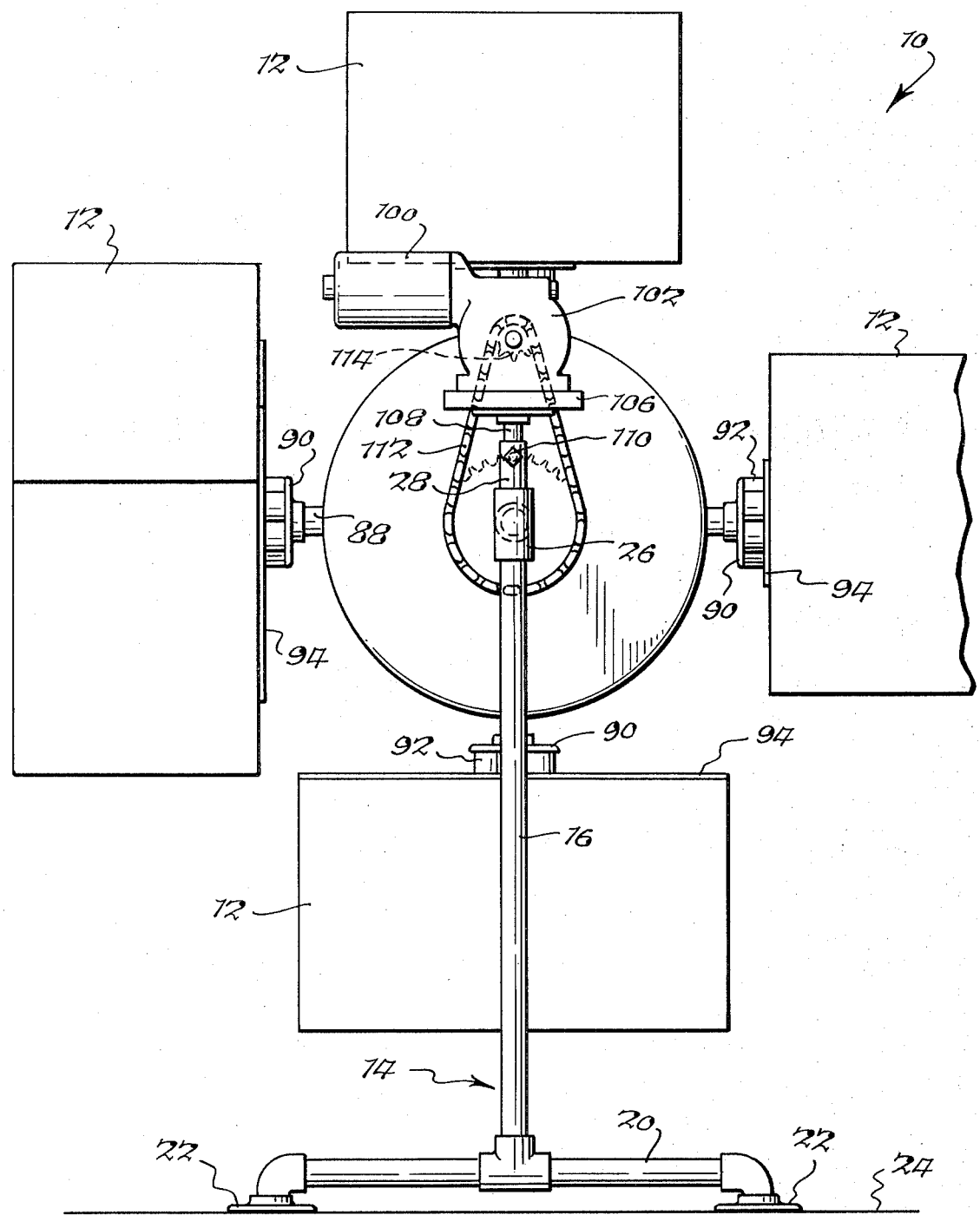
FIG. 2 is a side elevational view of the apparatus shown in FIG. 1.

Referring now in detail to the drawings, FIG. 1 illustrates an apparatus, comprehensively designated 10 and constructed in accordance with this invention, for detachably carrying a plurality of workpieces 12 and producing a compound, gyratory motion by which each workpiece is moved simultaneously about two intersecting axes. While the apparatus 10 is especially adapted to carry devices for holding a plurality of molds, it will be understood that the apparatus is in no manner restricted to such usage, but has utility in any application where it is desired to impart such a compound motion to a plurality of workpieces.

The apparatus 10 comprises a frame comprehensively designated 14 which includes a pair of upright standards 16 and 18. These standards are supported by cross bars 20 provided with feet or base members 22 adapted to rest on a floor 24 or other desired surface to which they may be attached by suitable means (not shown). Preferably the cross bars 20 are arranged substantially parallel, one to the other.

The upper end of the standard 16 is secured in the lower end of a tee 26. A nipple 28, coaxial with the standard 16, is engaged in the upper end of fitting 26 and a nipple 29, engaged in the other opening of the fitting, projects laterally inwardly. The upper end of the standard 18 is secured in the center opening of a tee fitting 30, the horizontal, opposite, end openings of the fitting 30 having secured therein tubing sections 32 and 34, respectively, which project generally normal to the cross bar 20 and in coaxial alignment with the nipple 29.

Such terms as "upper", "lower", "top", "bottom", "right", "left", "above", "below", "vertical", and "horizontal", and similar terms of position and/or direction which are used hereinafter refer to the illustration in FIG. 1, but are used only for convenience in description and/or reference. Such terms should not be so construed as to imply a necessary positioning of the structure or portions thereof or to limit the scope of this invention.

As will be seen from FIG. 3, an elongated rod or shaft 36, which constitutes a portion of frame 14, extends longitudinally within the aligned tubing sections 29, 34 and 32 and extends axially through a pair of spaced-apart, opposed, annular members 38 and 40, hereinafter more fully described. At its right end, the rod or shaft 36 is held in place and prevented from rotating by a bolt or pin 42 extending therethrough and engaging in the interior of the tee 26. At its left end, the rod 36 terminates within the nipple or tubing section 32, the left end portion of the rod being internally threaded for receiving the threaded stem 44 of a rotatable knob or handle 46. The inner face of the knob bears against the outer end of the tubing section 32 whereby the tees 26 and 30 are pulled together when the stem 44 is screwed into the rod or shaft 36.

An annular flanged member 50, to which is coaxially attached, by suitable means such as screws 52, a sprocket 54, is secured to a tubing section or nipple 56 adjacent the tee 26. The nipple 56 extends inwardly from the latter coaxially with the nipple 29 around the rod 36 on which it is rotatably mounted by bearings 48 and 61. At its inner end the nipple 56 is rigidly secured to an annular flanged member 58 which is rotatable therewith. The flanged member 58 carries a cup-like, annular member 38 to which it is attached by suitable means such as bolts 60 extending through the flanges of the member 58.

Another cup-like member 40 is carried by another annular flanged member 58 to which it is attached by suitable means such as bolts 60. The member 58 in this case, however, is stationary, being non-rotatably mounted on the inner, free end of the nipple or tubing section 34 and supported by the standard 18. The cup-like annular members 38 and 40 are preferably identical and molded from strong, durable, plastic material, such as hy-impact butadiene-styrene resin. Each of them comprises a base 62 having a preferably integral peripheral flange or rim 64 of substantial width extending normally from said base. Within each of the members 38 and 40 there is provided an annular lining disc 66 that substantially covers the inner face of the base 62 and is preferably formed of wood. The annular members are mounted, respectively, on the supporting annular flanged members 58 by the bolts 60 that extend through the members 58 and the lining discs 66, with the latter facing each other.

It will be understood that the construction of and composition of the tubing and fittings used in forming the frame 14 and the several nipples and flanged annular members employed therewith are not of importance to the present invention. For convenience they have been shown as lengths of pipe and pipe fittings but obviously other types of tubing, fittings, and connections between them may be used if desired.

Rotatably mounted centrally on the shaft or rod 36 between the cup-like members 38 and 40 is a bearing block 70 having four tapped radial bores 72 for threadedly receiving a corresponding member of shafts 74 circumferentially spaced apart approximately 90° from each other for mounting work-holding assemblies thereon. While preferably, as shown, there are four such assemblies, it should be understood that more or fewer than four assemblies can be utilized if desired. Since the work-holding assemblies are preferably identical in construction and operative in the same manner, it is believed that a detailed description of only one will suffice, it being understood that the same reference characters will be applied to identical elements in each of the four assemblies.

As best shown in FIG. 3, each work-holding assembly comprises a sleeve 76 secured, by suitable means such as rivets 78, to the shaft 74. A bearing is provided on the sleeve 76 for rotatably mounting a wheel 82 thereon. The wheel 82 preferably has a tread surface formed of rubber or other suitable resiliently yieldable material, which may be knurled or otherwise configured, and which is engagable with the annular discs 66, in the manner hereinafter described.

An annular flanged member 84 is secured to the outer side face of the wheel 82 by suitable means such as bolts 86. A nipple 88 is threadedly engaged with the member 84 and another annular flanged member 90 is threadedly engaged on the outer end of the nipple 88. A plurality of cylindrical permanent magnets 92 are suitably attached to the outer face of the flanged member 90, preferably in a symmetrical, annular arrangement. However, only one permanent magnet, or any other desired number, can be used within the purview of this invention. Thus, the magnets 92 are operatively connected to the wheel 82 for movement therewith bodily in a revolving orbital path about one axis and rotation about another axis intersecting the one axis, as will hereinafter be described, and serve for holding the work-piece 12 to be manipulated. The latter is provided with a plate 94 of iron or steel on the bottom thereof for mounting on the work-holding assembly.

The drive means for imparting the desired compound motion to the work holder assemblies comprises an electric motor 100 operatively connected through a suitable gear reduction mechanism 102 to an output shaft 104. The motor and gear reduction mechanism are secured to a platform 106 suitably mounted on a nipple 108 that is telescopically and adjustably received in the larger diameter nipple 28. Suitable means such as a set screw 110 threaded into the nipple 28 against the inner nipple 108 locks the latter and the platform 106 in a selected adjusted position. An endless drive chain 112 is trained about a drive sprocket 114 carried by the output shaft 104 and the sprocket 54 for rotating the tubular member 56, the cup-like annular member 38, and the annular disc 66.

In one method of operating the apparatus, the operator first turns the knob or handle 46 to effect axial movement of the shaft 36 toward the left, as viewed in FIG. 3, to urge the cup-like members 38 and 40 toward each other thereby pressing the discs 66 snugly against the peripheral surfaces of the wheels 82 of the work-holding assemblies. The workpieces 12 are then mounted on the work-holding assemblies by the metal plates 94 on the former engaging the permanent magnets 92. The motor 100, which is connected to a suitable source of electric power (not shown), is then energized by the actuation of a suitable switch (not shown).

The motor 100 effects rotation of the output shaft 104 and sprocket 114 to drive the endless chain 112 in an orbital path about the latter sprocket and sprocket 54 thereby to rotate the tubular member 56 and the cup-like annular member 38 attached thereto. Such rotation of the member 38 when the members 38 and 40 are pulled together, because of the frictional engagement of the annular disc member 66 in the member 38 with the peripheral surfaces of the wheels 82, causes the latter to rotate and roll on the annular member 66 in the member 40. Thus, each of the wheels 82 and the remainder of the respective work-holding assemblies describe orbital paths around an axis defined by the shaft or rod 36. Simultaneously, the wheels 82 of the work-holding assemblies rotate about their own respective axes, which coincide with the respective shafts 74 and extend perpendicularly to the axis of the shaft 36. As a result, the work-holding magnets 92 impart the same compound motion to the workpieces 12.

If desired, the starting procedure can be varied by first energizing the motor 100 and then effecting axial movement of the shaft 36 to pull together annular members 38 and 40. This method has the advantage that the motor does not start under load and the load can be gradually applied. Although relatively slow speeds of rotation are usually desirable, the driving motor 100 is preferably provided with a speed control mechanism (not shown) which permits adjustment of the speed of rotation.

While not restricted thereto, the apparatus 10 of this invention is especially adapted to receive a plurality of workpieces 12 in the form of mold clamping assemblies, each holding and securely retaining a plurality of book-type molds therein adapted for forming hollow chocolate products. The molds, after the cavities therein have been partially filled with a predetermined amount of liquid chocolate, are sealed and, while securely clamped in the clamping assemblies, are attached to the work-holding assemblies of the apparatus 10, the iron or steel plates 94 on the workpieces engaging the magnets 92 and holding the mold clamping assemblies in place while the apparatus 10 is operated to bodily revolve and rotate the clamping assemblies, and thereby the molds, about intersecting axes. Accordingly, a compound motion is imparted to the molds enabling the liquid chocolate therein to flow uniformly and completely over the irregular wall surfaces of the mold cavities to assume their respective shapes. This procedure is continued for a predetermined period of time until the liquid chocolate at least partially hardens or sets to form a shell conforming to the shape of the mold cavities. The clamping assemblies are then detached from their associated work-holding assemblies and the molds are stored in a "cold" room to allow the chocolate to completely harden.

The present invention thus provides a simple and inexpensive apparatus for manipulating workpieces in a manner imparting a compound motion thereto about intersecting axes. By the provision of permanent magnet workholders, the workpieces are conveniently and readily attached to and detached from the apparatus 10 by hand and, in fact, can be easily mounted and removed while the apparatus is operating, thus permitting continuous production with workpieces being removed at intervals and replaced by other workpieces. For convenience in determining the order of removal, suitable indicia such as colored bands, numbers or the like may be applied to easily visible portions of the work-holding assemblies, for example the nipples 88. It should be noted that the design of the present apparatus permits safe though convenient operation. The chain 112 and sprockets 52 and 114 can be easily covered with a guard (not shown) and the cup-like annular members 38 and 40 substantially enclose the rotating wheels 82 to prevent contact therewith. In addition, the driving mechanism includes a friction drive, i.e. the rotation of the wheels 82 by the disc 66 in the member 38, and thus under undue stress will slip. Further, since the workpieces are magnetically held on the workholding assemblies they will become detached if undue stress is applied.

While a preferred embodiment of the principles of this invention has been described and illustrated in detail, it should be understood that numerous other modifications thereof can be made without departing from the broad spirit and scope of this invention as defined in the appended claims.

I claim:

1. Apparatus for imparting a compound motion to at least one workpiece comprising: a frame; a horizontally extending, non-rotatable shaft comprising a portion of said frame; a plurality of work-holding assemblies extending radially outwardly from said shaft; means rotatably mounting said work-holding assemblies on said shaft; means carried by each of said work-holding assemblies for receiving workpieces; a pair of opposed, axially spaced annular members carried by said frame and movable axially with respect to each other, one of said annular members being rotatably mounted relative to the other of said annular members about a first axis coincident with said shaft; each of said work-holding assemblies having means interposed between said annular members and engagable therewith for bodily revolving said workholding assemblies about second axes, respectively, extending in directions perpendicular to said first axis, upon rotation of said rotatable annular member; means for moving said annular members axially with respect to each other; and drive means for rotating said rotatably mounted annular member.

2. Apparatus according to claim 1 wherein said interposed means comprises a wheel, frictionally driven by said rotatably mounted annular member, said wheel being rotatably mounted on a shaft connected at its inner end to said rotatable mounting means and extending radially therefrom, said radial shaft being coincident with one of said second axes.

3. Apparatus according to claim 1 wherein said means for moving said annular members axially comprises means engaging said non-rotatable shaft and another portion of said frame and adapted to move said shaft axially with respect to said other frame portion.

4. Apparatus according to claim 1 wherein said drive means includes: a motor, a pair of sprockets and chain means; one of said sprockets being operatively connected to said motor for rotation thereby, said other sprocket being mounted on a rotatable tube carried by said frame concentrically about said non-rotatable shaft and rigidly secured to said rotatably mounted annular member, and said chain means engaging said sprockets.

5. Apparatus according to claim 1 wherein at least one of said annular members comprises an annular cup-like element having an annular disc secured therein.

6. Apparatus according to claim 1 wherein each of said work-holding assemblies includes at least one permanent magnet for holding a workpiece thereto.

7. Apparatus according to claim 3 wherein said interposed means comprises a wheel frictionally driven by said rotatably mounted annular member, said wheel being rotatably mounted on a shaft connected at its inner end to said rotatable mounting means and extending radially therefrom, said radial shaft being coincident with one of said second axes.

8. Apparatus according to claim 3 wherein said drive means includes: a motor, a pair of sprockets and chain means; one of said sprockets being operatively connected to said motor for rotation thereby, said other sprocket being mounted on a rotatable tube carried by said frame concentrically about said non-rotatable shaft and rigidly secured to said rotatably mounted annular member, and said chain meansengaging said sprockets.

9. Apparatus according to claim 7 wherein said drive means includes: a motor, a pair of sprockets and chain means; one of said sprockets being operatively connected to said motor for rotation thereby, said other sprocket being mounted on a rotatable tube carried by said frame concentrically about said non-rotatable shaft and rigidly secured to said rotatably mounted annular member, and said chain means engaging said sprockets.

10. Apparatus according to claim 9 wherein at least one of said annular members comprises an annular cup-like element having an annular disc secured therein.

* * * * *